US012139071B2

(12) United States Patent
Chang et al.

(10) Patent No.: US 12,139,071 B2
(45) Date of Patent: Nov. 12, 2024

(54) COLLISION WARNING SYSTEM AND METHOD FOR VEHICLE

(71) Applicant: INSTITUTE FOR INFORMATION INDUSTRY, Taipei (TW)

(72) Inventors: Jun-Dong Chang, Taipei (TW); Ning Chun Hsiao, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 421 days.

(21) Appl. No.: 17/457,035

(22) Filed: Dec. 1, 2021

(65) Prior Publication Data
US 2023/0150428 A1 May 18, 2023

(30) Foreign Application Priority Data

Nov. 12, 2021 (TW) .................................. 110142242

(51) Int. Cl.
*B60Q 9/00* (2006.01)
*G06T 5/80* (2024.01)
(Continued)

(52) U.S. Cl.
CPC ................. *B60Q 9/008* (2013.01); *G06T 5/80* (2024.01); *G06T 7/50* (2017.01); *G06T 7/70* (2017.01);
(Continued)

(58) Field of Classification Search
None
See application file for complete search history.

(56) References Cited

U.S. PATENT DOCUMENTS 6,370,475 B1 *  4/2002  Breed .................... G08G 1/161
                                                    340/436
8,311,730 B2 * 11/2012  Neff ...................... B60W 40/02
                                                    701/1
(Continued)

FOREIGN PATENT DOCUMENTS

CN       112896159 A    6/2021
CN       113276769 A    8/2021

OTHER PUBLICATIONS

Google Patent Translation of CN112896159A, cited by applicant in IDS submitted on Aug. 21, 2022. Originally published Jun. 4, 2021, Available online at: https://patents.google.com/patent/CN112896159A/en?oq=CN112896159 (Year: 2021).*
(Continued)

*Primary Examiner* — Tahmina N Ansari
(74) *Attorney, Agent, or Firm* — CKC & Partners Co., LLC

(57) ABSTRACT

A collision warning system and method are provided. The system includes an image capturing apparatus, a sensing apparatus, and a computing apparatus. The computing apparatus analyzes a vehicle side image to generate a plurality of objects and an object coordinate corresponding to each of the objects. The computing apparatus calculates an aerial view coordinate corresponding to each of the objects based on the object coordinates and a pitch angle corresponding to the image capturing apparatus. The computing apparatus calculates a predicted collision time between the vehicle and each of the objects based on a vehicle speed, a turning angle, and the aerial view coordinates. The computing apparatus generates a plurality of warning regions and determines a warning scope corresponding to each of the warning regions based on the predicted collision times.

20 Claims, 5 Drawing Sheets

(51) Int. Cl.
    *G06T 7/50*          (2017.01)
    *G06T 7/70*          (2017.01)
    *G08B 7/06*          (2006.01)

(52) U.S. Cl.
    CPC ...... *G08B 7/06* (2013.01); *G06T 2207/30261* (2013.01)

(56) References Cited

U.S. PATENT DOCUMENTS

| | | | |
|---|---|---|---|
| 9,428,186 B2 * | 8/2016 | Breed | G06V 20/56 |
| 10,134,281 B2 * | 11/2018 | Kodama | G08G 1/162 |
| 11,014,552 B2 * | 5/2021 | Tsuruoka | B60W 30/09 |
| 2018/0326979 A1 * | 11/2018 | Tsuruoka | B60W 10/20 |
| 2023/0150428 A1 * | 5/2023 | Chang | B60Q 9/008 |
| | | | 382/103 |

OTHER PUBLICATIONS

The office action of the corresponding Taiwanese application No. TW110142242 issued on Jul. 5, 2022.

\* cited by examiner

COLLISION WARNING SYSTEM AND METHOD FOR VEHICLE

CROSS-REFERENCE TO RELATED APPLICATION

This application claims priority to Taiwan Application Serial Number 110142242, filed Nov. 12, 2021, which is herein incorporated by reference in its entirety.

BACKGROUND

Field of Invention

The present invention relates to a collision warning system and method. More particularly, the present invention relates to a collision warning system and method for generating a plurality of warning regions by analyzing the vehicle side image.

Description of Related Art

Vehicles are important means of transportation and are widely used in road transportation. However, when vehicles are turning and changing lanes at intersections, the driver is often not cautious enough, or faces the blind spot problems of the difference of radius between inner wheels, which causes collisions between the vehicle and objects on the road (such as pedestrians, motorcycles, bicycles, etc.).

In the current driving assistance system, although there are millimeter wave radars can be used to detect other vehicle objects. However, in crowded areas with dense traffic, excessive warnings may occur (for example, the detection of the driving assistance system is excessive sensitivity, and frequently remind the drivers), and two-wheeled vehicles and pedestrians cannot be distinguished. Therefore, in the current driving assistance system, there is currently a lack of warning technology that can be used for detecting the blind spot of the difference of radius between inner wheel and dynamically adjusting the scope of the warning regions.

Accordingly, there is an urgent need for a technology that can accurately generate a plurality of warning regions to remind drivers and adjust the warning scope of the warning regions according to the conditions of the vehicle.

SUMMARY

An objective of the present invention is to provide a collision warning system. The collision warning system comprises an image capturing apparatus, a sensing apparatus, and a computing apparatus. The computing apparatus is connected to the image capturing apparatus and the sensing apparatuses through a network. The image capturing apparatus is installed at a side position of a vehicle to generate a vehicle side image. The sensing apparatus is configured to sense a vehicle speed and a turning angle of the vehicle. The computing apparatus analyzes the vehicle side image to generate a plurality of objects and an object coordinate corresponding to each of the objects. The computing apparatus calculates an aerial view coordinate corresponding to each of the objects based on the object coordinates and a pitch angle corresponding to the image capturing apparatus. The computing apparatus calculates a predicted collision time between the vehicle and each of the objects based on the vehicle speed, the turning angle, and the aerial view coordinates. The computing apparatus generates a plurality of warning regions and determining a warning scope corresponding to each of the warning regions based on the predicted collision times.

Another objective of the present invention is to provide a collision warning method, which is adapted for use in a collision warning system. The collision warning system comprises an image capturing apparatus, a sensing apparatus, and a computing apparatus. The image capturing apparatus is installed at a side position of a vehicle. The image capturing apparatus is configured to generate a vehicle side image. The sensing apparatus is configured to sense a vehicle speed and a turning angle of the vehicle. The collision warning method is performed by the computing apparatus. The collision warning method comprises following steps: analyzing the vehicle side image to generate a plurality of objects and an object coordinate corresponding to each of the objects; calculating an aerial view coordinate corresponding to each of the objects based on the object coordinates and a pitch angle corresponding to the image capturing apparatus; calculating a predicted collision time between the vehicle and each of the objects based on the vehicle speed, the turning angle, and the aerial view coordinates; and generating a plurality of warning regions and determining a warning scope corresponding to each of the warning regions based on the predicted collision times.

According to the above descriptions, the collision warning technology (including the system and the method) provided by the present invention generates a plurality of objects and an object coordinate corresponding to each of the objects by analyzing the vehicle side image, calculates an aerial view coordinate corresponding to each of the objects based on the object coordinates and a pitch angle corresponding to the image capturing apparatus. Furthermore, the collision warning technology provided by the present invention calculates a predicted collision time between the vehicle and each of the objects based on the vehicle speed, the turning angle, and the aerial view coordinates. Finally, the collision warning technology provided by the present invention generates a plurality of warning regions and determines a warning scope corresponding to each of the warning regions based on the predicted collision times. The collision warning technology provided by the present invention accurately calculates the predicted collision time between the vehicle and each of the objects by considering the state of the vehicle, so that the warning scope of each of the warning regions can be dynamically adjusted to remind drivers to pay attention. In addition, the present invention further adds a fixed scope of the warning conditions to appropriately remind the driver of objects that are too close, so as to provide the driver with more reaction time. The collision warning technology provided by the present invention can adaptability adjust the warning scope of each of the warning regions according to the condition of the vehicle, and reduce the problem of excessively frequent or excessively loose warnings caused by the threshold setting problem.

The detailed technology and preferred embodiments implemented for the subject invention are described in the following paragraphs accompanying the appended drawings for people skilled in this field to well appreciate the features of the claimed invention.

DETAILED DESCRIPTION

In the following description, a collision warning system and method according to the present invention will be explained with reference to embodiments thereof. However, these embodiments are not intended to limit the present invention to any environment, applications, or implementations described in these embodiments. Therefore, description of these embodiments is only for purpose of illustration rather than to limit the present invention. It shall be appreciated that, in the following embodiments and the attached drawings, elements unrelated to the present invention are omitted from depiction. In addition, dimensions of individual elements and dimensional relationships among individual elements in the attached drawings are provided only for illustration but not to limit the scope of the present invention.

Figure 1:
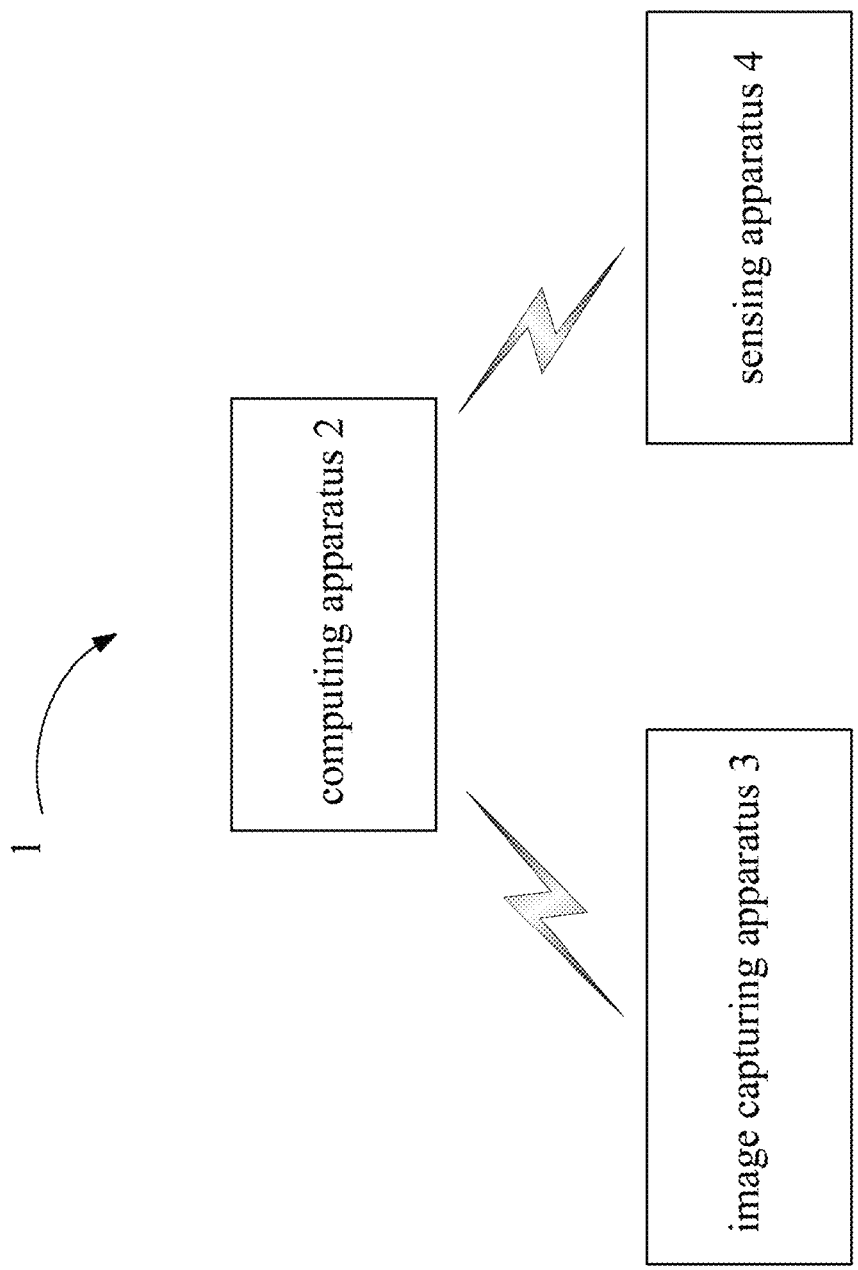
FIG. 1 is a schematic view depicting a collision warning system of the first embodiment.

First, the application scenario of the present embodiment will be explained, and a schematic view is depicted in FIG. 1. As shown in FIG. 1, the collision warning system 1 comprises the computing apparatus 2, the image capturing apparatus 3, and the sensing apparatus 4, and the computing apparatus 2 is connected to the image capturing apparatus 3 and the sensing apparatus 4 through a network. In this scenario, the image capturing apparatus 3 can be installed at a side position of a vehicle and used to generate a vehicle side image. For example, the image capturing apparatus 3 can be installed at one or both sides of the rear end of the vehicle (e.g., the left and right sides of the vehicle), and the image capturing apparatus 3 obtains images from the rear end of the vehicle toward the front side of the vehicle body (e.g., from the top-down perspective). For another example, the image capturing apparatus 3 may also be installed near the left and right rear mirrors in front of the vehicle, and images are obtained from the front end of the vehicle toward the rear side of the vehicle body.

In this scenario, the sensing apparatus 4 is used to sense a vehicle speed and a turning angle of the vehicle. For example, the sensing apparatus 4 can be installed behind the driver's seat, around the steering wheel, or around the rotating element of the vehicle to sense the vehicle speed and the turning angle of the vehicle. For example, the sensing apparatus 4 may include at least one of a global positioning system, an inertial sensor (e.g., a gyroscope), an acceleration sensor, a timer, etc., or a combination thereof. In some embodiments, the sensing apparatus 4 can also obtain the vehicle speed and turning angle of the vehicle through a Controller Area Network (CAN bus).

It shall be appreciated that the image capture apparatus 3 can continuously generate the vehicle side image (e.g., at a frequency of 10 times per second), and transmit the vehicle side image to the computing apparatus 2, and the computing apparatus 2 will perform the subsequent analysis operations.

It shall be appreciated that, in this scenario of the present invention, the collision warning system 1 can initiate the collision warning mechanism when the vehicle is in the "turning or changing lanes" state or in the "going straight" state. The collision warning system 1 can determine that the vehicle is currently in the "turning or changing lanes" state or in the "going straight" state through a variety of methods.

For example, the collision warning system 1 can determine that the vehicle is currently in the "turning or changing lanes" state or in the "going straight" state based on the turn signal of the vehicle (e.g., the left and right turn signal, which can be sensing by the sensing apparatus 4) and the vehicle speed. For another example, the collision warning system 1 can determine that the vehicle is currently in the "turning or changing lanes" state or in the "going straight" state based on the turning angle and the vehicle speed. It shall be appreciated that the present invention does not limit the method of determining the state of the vehicle, any method of determining the current state of the vehicle should fall within the scope of the present invention. Those of ordinary skill in the art shall appreciate the corresponding operations of determining the current state of the vehicle based on the above description. Therefore, the details will not be repeated herein.

Figure 2:
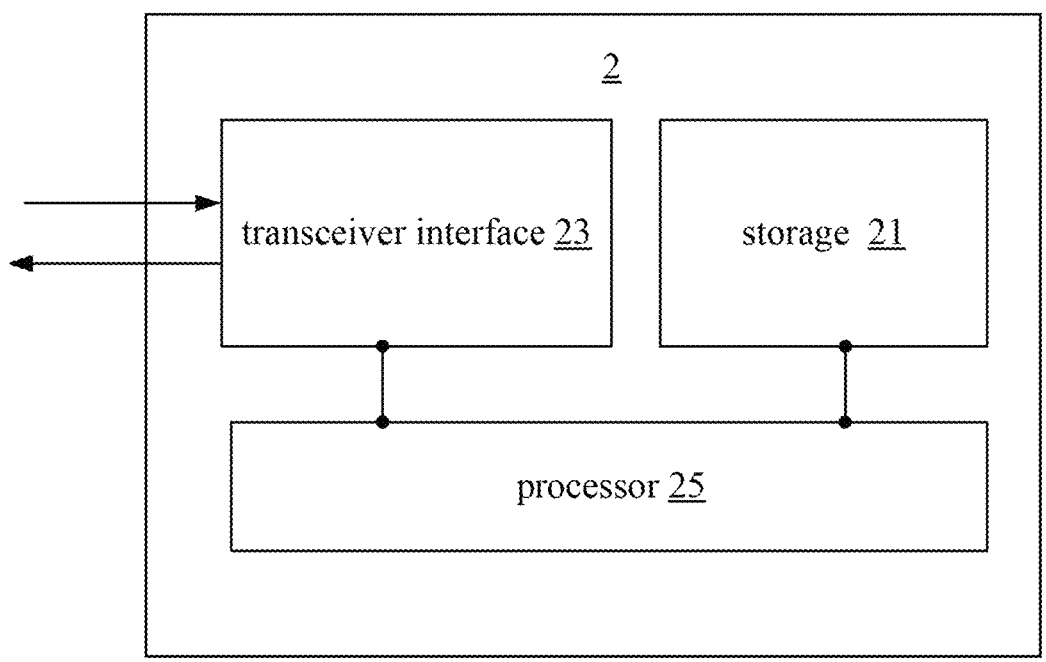
FIG. 2 is a schematic view depicting a computing apparatus of the first embodiment.

The schematic view of the structure of the computing apparatus 2 in the first embodiment of the present invention is depicted in FIG. 2. The computing apparatus 2 comprises a storage 21, a transceiver interface 23 and a processor 25, wherein the processor 25 is electrically connected to the storage 21 and the transceiver interface 23. The storage 21 may be a memory, a Universal Serial Bus (USB) disk, a hard disk, a Compact Disk (CD), a mobile disk, or any other storage medium or circuit known to those of ordinary skill in the art and having the same functionality. The transceiver interface 23 is an interface capable of receiving and transmitting data or other interfaces capable of receiving and transmitting data and known to those of ordinary skill in the art. The transceiver interface 23 can receive data from sources such as external apparatuses, external web pages, external applications, and so on. The processor 25 may be any of various processors, Central Processing Units (CPUs), microprocessors, digital signal processors or other computing apparatuses known to those of ordinary skill in the art.

First, in the present embodiment, the computing apparatus 2 receives a vehicle side image from the image capturing apparatus 3. Then, the computing apparatus 2 analyzes the vehicle side image to generate a plurality of objects and an object coordinate corresponding to each of the objects. For example, the computing apparatus 2 can perform an object detection operation on the vehicle side image, mark a plurality of object frames in the vehicle side image, and use the center point of the lower edge of each of the object frames as the object coordinate of each of the objects. It shall be appreciated that the purpose of the object detection operation is to detect objects in the vehicle side image that need to be reminded of driver's attention, such as pedestrians, bicycles, motorcycles, and so on.

In some embodiments, the computing apparatus 2 further stores an object detection model, and the computing apparatus 2 performs the object detection operation on the vehicle side image through the object detection model to generate the objects and the object coordinates corresponding to each of the objects. It shall be appreciated that the object detection model is a model that has been trained with a large amount of data (e.g., training through a neural network), and the object detection model can identify objects of interest in the image (e.g., the vehicle side image) and mark each of the objects with an object frame.

In addition, in some embodiments, since there may exist some objects far away (i.e., at a distance that is unlikely to collide with the vehicle) in the vehicle side image, the computing apparatus 2 can also set the detection conditions of the object detection model to extract only the objects that meet the conditions from the vehicle side image to avoid excessive warnings. For example, when the size of the object does not exceed a value, the computing apparatus 2 will not mark the object to filter objects that are too far away.

Next, in the present embodiment, the computing apparatus 2 will perform an aerial view coordinates conversion on the vehicle side image to generate the aerial view coordinates based on the external parameters of the vehicle side image (e.g., the angle at which the image capturing apparatus 3 captures the vehicle side image). Specifically, the computing apparatus 2 calculates an aerial view coordinate corresponding to each of the objects based on the object coordinates and a pitch angle corresponding to the image capturing apparatus 3.

In some embodiments, in order to capture a more complete angle of the image, the image capturing apparatus 3 may generate the vehicle side image through a wide-angle lens or the like. However, the use of a non-general lens will cause some distance distortions in the image of the vehicle side image. Therefore, in order to obtain the coordinate position of each of the objects more accurately, it is necessary to perform distortion correction on the vehicle side image before generating the aerial view coordinates. Specifically, the computing apparatus 2 performs a distortion correction operation on the vehicle side image based on a apparatus parameter of the image capturing apparatus 3 (e.g., the focal length of the image capturing apparatus 3, the internal parameters of the shooting lens, etc.) to generate a corrected object coordinate corresponding to each of the objects. Next, the computing apparatus 2 generates the aerial view coordinate corresponding to each of the objects based on the corrected object coordinates and the pitch angle corresponding to the image capturing apparatus.

Figure 3:
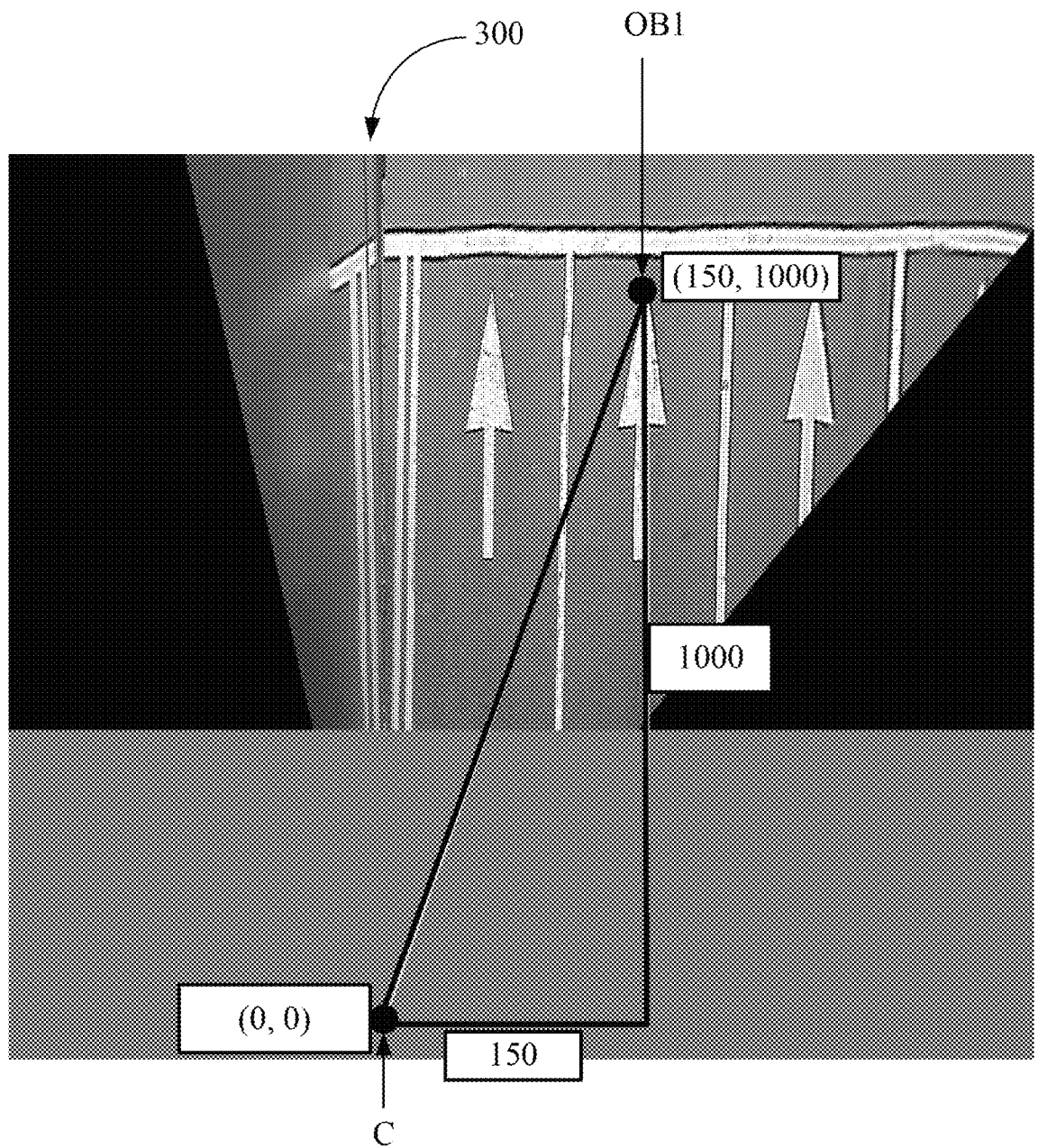
FIG. 3 is a schematic view depicting a vehicle side image through a distortion correction operation and an aerial view coordinates conversion of the first embodiment.

For ease of understanding, take a practical example as an example, please refer to FIG. 3. FIG. 3 illustrates a a schematic view of the vehicle side image 300 after performing the distortion correction operation and the aerial view coordinates conversion, wherein the image capturing apparatus 3 is located at the position "C", and the object "OB1" is one of the objects in the vehicle side image. In this example, the position "C" of the image capturing apparatus 3 is taken as the origin (0, 0) of the coordinates, and the aerial view coordinates of the object "OB1" after performing the aerial view coordinates conversion is (150, 1000). From the aerial view coordinates in FIG. 3, it can be seen that the horizontal distance between the object "OB1" and the image capturing apparatus 3 is 150 cm, and the vertical distance is 1000 cm. It shall be appreciated that the image capturing apparatus 3 is fixedly installed at a certain position of the vehicle, and the image capturing apparatus 3 takes the image from a fixed direction to generate the vehicle side image. Therefore, the distance relationship between each of the objects and the image capturing apparatus 3 can be accurately obtained from the correspondence between the aerial view coordinates.

Next, the computing apparatus 2 calculates the predicted collision time based on the driving information of the vehicle and the aerial view coordinates corresponding to the objects. Specifically, the computing apparatus 2 calculates a predicted collision time between the vehicle and each of the objects based on the vehicle speed, the turning angle, and the aerial view coordinates. It shall be appreciated that the predicted collision time indicates the predicted collision time between each of the objects and the vehicle. For example, when the computing apparatus 2 calculates the predicted collision time between the object OB1 and the vehicle is 1.5 seconds, it means that the vehicle with the current vehicle speed and the turning angle will collide with the object OB1 after 1.5 seconds.

For example, the predicted collision time can be generated by an Time To Collision (i.e., TTC) algorithm that calculates the vehicle collision time. It shall be appreciated that the present invention does not limit the algorithm for calculating the predicted collision time. Any algorithm that can predict the time of collision based on the vehicle speed, the turning angle, and the aerial view coordinates should fall within the scope of the present invention. Those of ordinary skill in the art shall appreciate the corresponding operations of generating the predicted collision time based on these descriptions. Therefore, the details will not be repeated herein.

In some embodiments, the computing apparatus 2 calculates a horizontal distance and a vertical distance between each of the objects and the image capturing apparatus based on the aerial view coordinates. Then, the computing apparatus 2 calculates the predicted collision time between the vehicle and each of the objects based on the vehicle speed, the turning angle, and the horizontal distance and the vertical distance corresponding to each of the objects.

Finally, the computing apparatus 2 generates a plurality of warning regions based on the predicted collision times, and determines a warning scope for each of the warning regions based on the predicted collision times at the same time. It shall be appreciated that the computing apparatus 2 continuously analyzes the driving information of the vehicle and the aerial view coordinates corresponding to the objects (i.e., the new vehicle side image). Therefore, the computing apparatus 2 can dynamically adjust the warning scope of each of the warning regions.

Figure 4A:
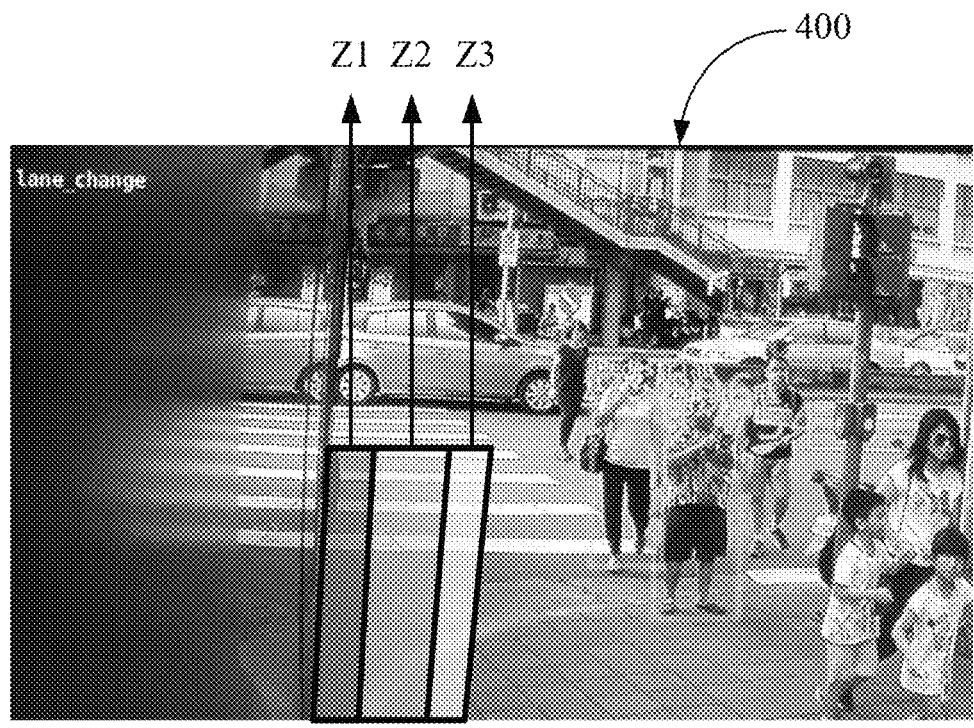
FIG. 4A is a schematic view depicting a vehicle side image of the first embodiment.
Figure 4B:
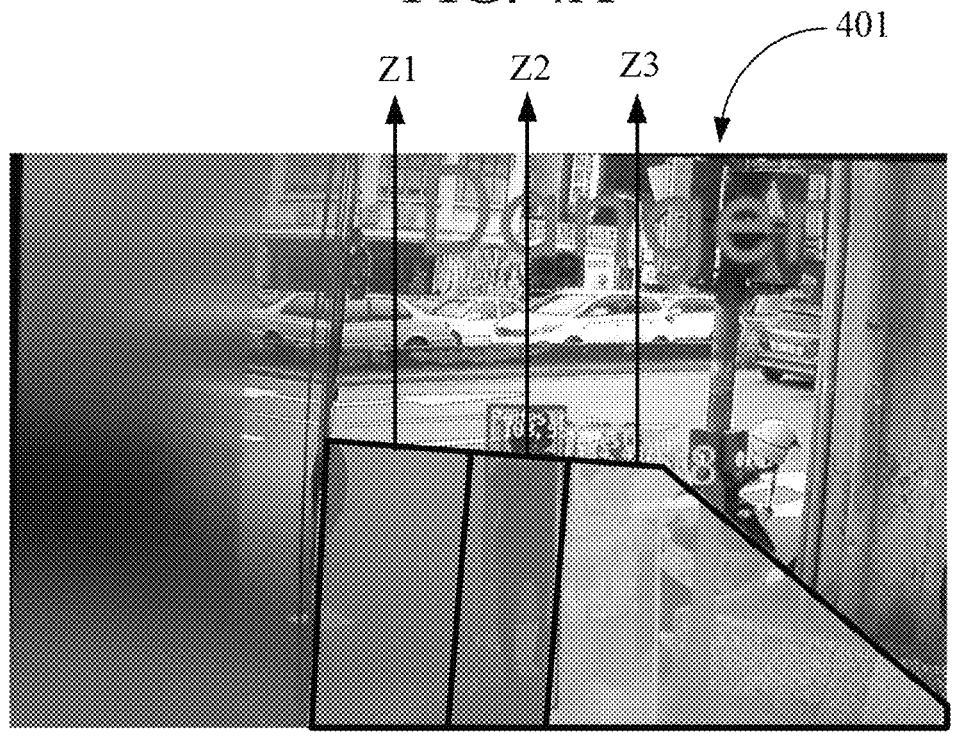
FIG. 4B is a schematic view depicting a vehicle side image of the first embodiment.

Taking a practical example for example, please refer to FIG. 4A and FIG. 4B at the same time. FIG. 4A illustrates the vehicle side image 400 when the vehicle speed is 1 km/h and the turning angle is 2 degrees/sec. In FIG. 4A, the warning regions include the zone Z1, the zone Z2, and the zone Z3. In this example, the zone Z1 corresponds to the warning scope framed for the predicted collision time is less than 1.2 seconds, the zone Z2 corresponds to the warning scope framed for the predicted collision time is less than 2 seconds but greater than 1.2 seconds, and the zone Z3 corresponds to the warning scope framed for the predicted collision time is greater than 2 seconds but less than 3 seconds. For example, when the computing apparatus 2 determines that an object is located in the zone Z1, it means that the predicted collision time between the object and the vehicle is less than 1.2 seconds.

FIG. 4B illustrates the vehicle side image 401 when the vehicle speed is 2 km/h, and the turning angle is 10 degrees/sec. In FIG. 4B, the warning regions also include the zone Z1 (i.e., the warning scope with the predicted collision time of less than 1.2 seconds), the zone Z2 (i.e., the warning scope with the predicted collision time of less than 2 seconds but greater than 1.2 seconds), and the zone Z3 (i.e., the warning scope with the predicted collision time is greater than 2 seconds but less than 3 seconds). However, as shown in FIG. 4B, compared with the warning scopes in FIG. 4A, the warning scopes covered by the zone Z1, the zone Z2, and the zone Z3 have been significantly expanded. In this example, since the current vehicle speed has been increased by 2 times, and the turning angle has been increased to 10 degrees per second, the warning scopes calculated based on the same predicted collision time will expand when the vehicle speed and the turning angle increase. Therefore, in order to accurately generate the warning scopes, the computing apparatus 2 will dynamically adjust the warning scope of each of the warning regions based on the condition of the vehicle and the predicted collision times.

It shall be appreciated that, in addition to the zone Z1, the zone Z2 and the zone Z3 can be adjusted by predicting the collision time, the warning scopes of the zone Z1, the zone Z2 and the zone Z3 can also be adjusted based on the horizontal distance and the vertical distance corresponding to the image capturing apparatus 3. For example, if the image capturing apparatus 3 is installed at the rear of the vehicle, and the length of the vehicle body is 11 meters. The warning scopes of the zone Z1, the zone Z2, and the zone Z3 can be reduced to the scope that is within 12 meters of the vertical distance and 3.5 meters of the horizontal distance from the image capture apparatus 3 (i.e., the objects with the vertical distance of more than 12 meters from the image capture apparatus 3 are unlikely to collide) to exclude objects that are too far away and unlikely to collide to avoid excessive warnings.

In some embodiments, in order to prevent the driver from suddenly accelerating and causing the warning scopes to be unable to be adjusted instantly and causing danger (e.g., the vehicle accelerates when starting). The computing apparatus 2 can further set a fixed scope distance, the computing apparatus 2 can generate a warning message when the distance of the object is lower than the fixed scope distance. Specifically, the computing apparatus 2 calculates a horizontal distance between each of the objects and the image capturing apparatus 3 based on the aerial view coordinates (i.e., the computing apparatus 2 calculates the horizontal distance between each of the aerial view coordinates of the objects and the image capturing apparatus 3 respectively). Next, the computing apparatus 2 determines whether there exists at least one shortest horizontal distance lower than a first horizontal preset distance among the horizontal distances corresponding to each of the aerial view coordinates. Then, the computing apparatus 2 generates a warning message when determining that there exists the at least one shortest horizontal distance.

In some embodiments, the computing apparatus 2 activates the collision warning mechanism when determining that the vehicle is in the "turning or changing lanes" state. Specifically, the computing apparatus 2 will determine whether the turning angle of the vehicle is greater than or equal to a threshold and the vehicle speed is greater than zero. When the computing apparatus 2 determines that the turning angle of the vehicle is greater than or equal to the threshold and the vehicle speed is greater than zero, generates the warning regions and determines the warning scope corresponding to each of the warning regions based on the predicted collision times. In some embodiments, the computing apparatus 2 can also determine whether the vehicle emits a turn signal and the vehicle speed is greater than zero to determine that the vehicle is in the "turning or changing lanes" state. When the computing apparatus 2 determines that the vehicle emits a turn signal and the vehicle speed is greater than zero, the computing apparatus 2 generates the warning regions and determines the warning scope corresponding to each of the warning regions based on the predicted collision times.

In some embodiments, the computing apparatus 2 may further activate the collision warning mechanism to remind the driver that an object is too close to the vehicle when determining that the vehicle is in the "going straight" state. Specifically, when the computing apparatus 2 determines that the turning angle of the vehicle is less than a threshold and the vehicle speed is greater than zero, the computing apparatus 2 determines whether there exists a second aerial view coordinate among the aerial view coordinates that a distance to the image capturing apparatus 3 is lower than a second preset horizontal distance and a second preset vertical distance. Next, the computing apparatus 2 generates a warning message when determining that there exists the second aerial view coordinate that the distance to the image capturing apparatus 3 is lower than the second preset horizontal distance and the second preset vertical distance.

In some embodiments, the collision warning system 1 further comprises a display, and the display is configured to display the warning regions to remind a driver of the vehicle. It shall be appreciated that the computing apparatus 2 can remind the driver of the vehicle to pay attention through the display. For example, when the vehicle is turning, the display displays the vehicle side image divided into different warning regions (as shown in FIG. 4A and FIG. 4B, the display displays the regions in different colors based on different alert levels), buzzer sounds, and so on.

In some embodiments, the computing apparatus 2 may refer to the driver's reaction time (e.g., the required average reaction time), and set the warning levels based on different predicted collision times. For example, the computing apparatus 2 can divide the reaction time into three levels (e.g., immediate dangerous, dangerous, and normal), and generate the corresponding warning message when an object appears in the warning regions of different warning levels.

For example, the computing apparatus 2 determines whether a third aerial view coordinate among the aerial view coordinates is located in the warning regions (i.e., whether there is an object located in the warning scope of each warning regions), wherein the warning regions comprises at least a first warning region, a second warning region, and a third warning region. In this example, the computing apparatus 2 generates a warning scope image corresponding to the vehicle side image based on the warning scope of each of the warning regions when the third aerial view coordinate is located in the third warning region. The computing apparatus 2 generates a stained image (e.g., an image stained in red) corresponding to the vehicle side image to remind the driver when the third aerial view coordinate is located in the second warning region. The computing apparatus 2 generates a warning sound to remind the driver when the third aerial view coordinate is located in the third warning region.

According to the above descriptions, the collision warning system 1 provided by the present invention generates a plurality of objects and an object coordinate corresponding to each of the objects by analyzing the vehicle side image, calculates an aerial view coordinate corresponding to each of the objects based on the object coordinates and a pitch angle corresponding to the image capturing apparatus. Furthermore, the collision warning system 1 calculates a predicted collision time between the vehicle and each of the objects based on the vehicle speed, the turning angle, and the aerial view coordinates. Finally, the collision warning system 1 generates a plurality of warning regions and determines a warning scope corresponding to each of the warning regions based on the predicted collision times. The collision warning technology provided by the present invention accurately calculates the predicted collision time between the vehicle and each of the objects by considering the state of the vehicle, so that the warning scope of each of the warning regions can be dynamically adjusted to remind drivers to pay attention. In addition, the present invention further adds a fixed scope of the warning conditions to appropriately remind the driver of objects that are too close, so as to provide the driver with more reaction time. The collision warning technology provided by the present invention can adaptability adjust the warning scope of each of the warning regions according to the condition of the vehicle, and reduce the problem of excessively frequent or excessively loose warnings caused by the threshold setting problem.

Figure 5:
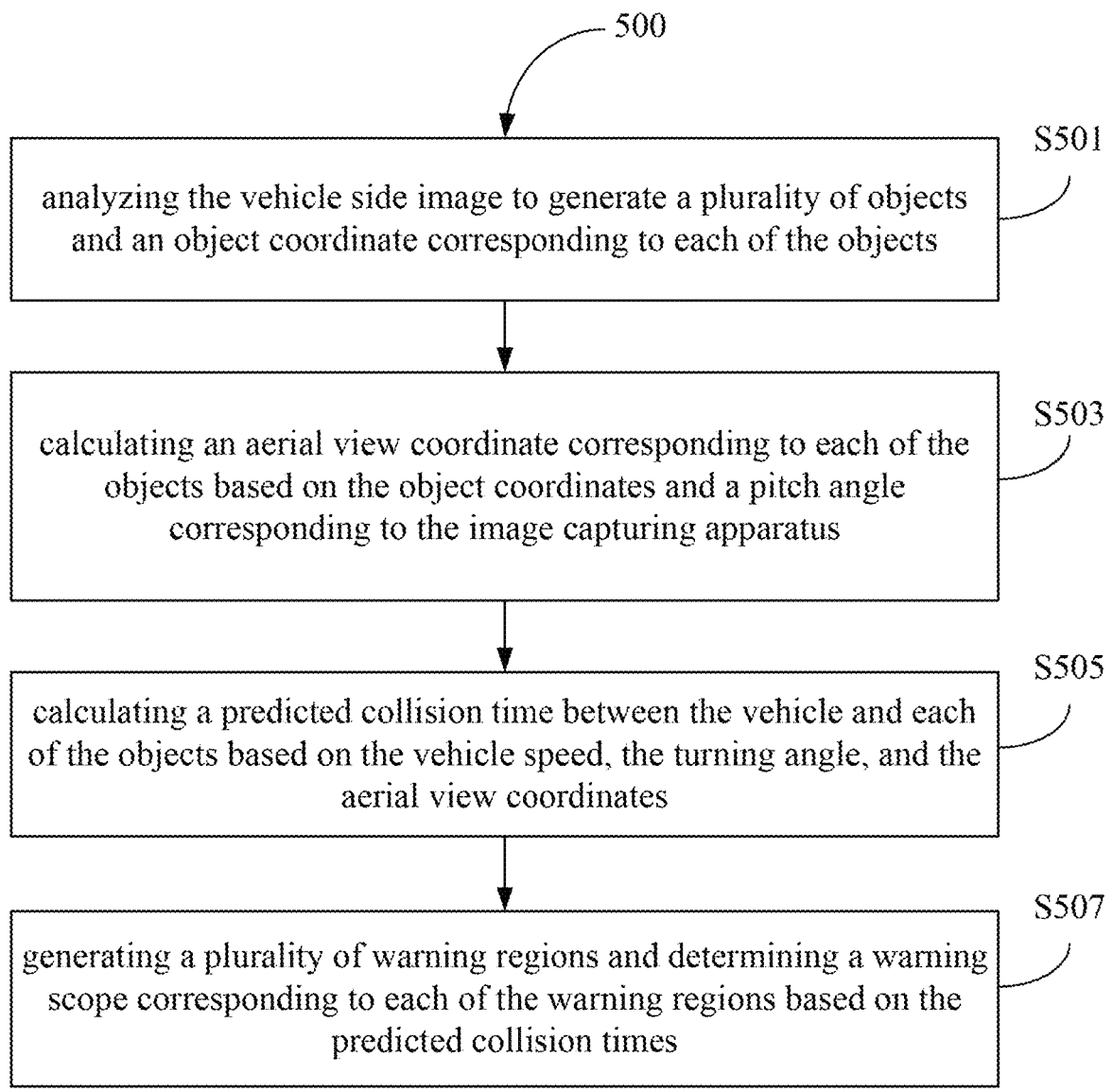
FIG. 5 is a partial flowchart depicting a collision warning method of the second embodiment.

A second embodiment of the present invention is a collision warning method and a flowchart thereof is depicted in FIG. 5. The collision warning method 500 is adapted for a collision warning system (e.g., the collision warning system 1 of the first embodiment). The collision warning system comprises an image capturing apparatus, a sensing apparatus, and a computing apparatus (e.g., the image capturing apparatus 3, the sensing apparatus 4, and the computing apparatus 2 of the first embodiment). The image capturing apparatus is installed at a side position of a vehicle and configured to generate a vehicle side image. The sensing apparatus is configured to sense a vehicle speed and a turning angle of the vehicle. The collision warning method 500 is performed by the computing apparatus and generates a plurality of warning regions and determines a warning scope corresponding to each of the warning regions through the steps S501 to S507.

In the step S501, the the computing apparatus analyzes the vehicle side image to generate a plurality of objects and an object coordinate corresponding to each of the objects. Next, in the step S503, the computing apparatus calculates an aerial view coordinate corresponding to each of the objects based on the object coordinates and a pitch angle corresponding to the image capturing apparatus.

Next, in the step S505, the computing apparatus calculates a predicted collision time between the vehicle and each of the objects based on the vehicle speed, the turning angle, and the aerial view coordinates. Finally, in the step S507, the computing apparatus generates a plurality of warning regions and determining a warning scope corresponding to each of the warning regions based on the predicted collision times.

In some embodiments, wherein the computing apparatus further stores an object detection model, and the collision warning method 500 further comprises following steps: performing an object detection operation on the vehicle side image through the object detection model to generate the objects and the object coordinates corresponding to each of the objects.

In some embodiments, the collision warning method 500 further comprises following steps: performing a distortion correction operation on the vehicle side image based on a apparatus parameter of the image capturing apparatus to generate a corrected object coordinate corresponding to each of the objects; and generating the aerial view coordinate corresponding to each of the objects based on the corrected object coordinates and the pitch angle corresponding to the image capturing apparatus.

In some embodiments, the collision warning method 500 further comprises following steps: calculating a horizontal distance and a vertical distance between each of the objects and the image capturing apparatus based on the aerial view coordinates; and calculating the predicted collision time between the vehicle and each of the objects based on the vehicle speed, the turning angle, and the horizontal distance and the vertical distance corresponding to each of the objects.

In some embodiments, the collision warning method 500 further comprises following steps: calculating a horizontal distance between each of the objects and the image capturing apparatus (i.e., calculates the horizontal distance between each of the the aerial view coordinates and the image capturing apparatus) based on the aerial view coordinates; determining whether there exists at least one shortest horizontal distance lower than a first horizontal preset distance among the horizontal distances corresponding to each of the aerial view coordinates; and generating a warning message when determining that there exists the at least one shortest horizontal distance.

In some embodiments, the collision warning method 500 further comprises following steps: determining whether there exists a second aerial view coordinate among the aerial view coordinates that a distance to the image capturing apparatus is lower than a second preset horizontal distance and a second preset vertical distance when determining that the turning angle of the vehicle is less than a threshold and the vehicle speed is greater than zero; and generating a warning message when determining that there exists the second aerial view coordinate that the distance to the image capturing apparatus is lower than the second preset horizontal distance and the second preset vertical distance.

In some embodiments, the collision warning method 500 further comprises following steps: determining whether the turning angle of the vehicle is greater than or equal to a threshold and the vehicle speed is greater than zero; and generating the warning regions and determining the warning scope corresponding to each of the warning regions based on the predicted collision times when determining that the turning angle of the vehicle is greater than or equal to the threshold and the vehicle speed is greater than zero.

In some embodiments, the collision warning method 500 further comprises following steps: determining whether the vehicle emits a turn signal and the vehicle speed is greater than zero; and generating the warning regions and determining the warning scope corresponding to each of the warning regions based on the predicted collision times when determining that the vehicle emits the turn signal and the vehicle speed is greater than zero.

In some embodiments, wherein the collision warning system further comprises a display, and the display is configured to display the warning regions to remind a driver of the vehicle.

In some embodiments, the collision warning method 500 further comprises following steps: determining whether a third aerial view coordinate among the aerial view coordinates is located in the warning regions, wherein the warning regions comprises at least a first warning region, a second warning region, and a third warning region; generating a warning scope image corresponding to the vehicle side image based on the warning scope of each of the warning regions when the third aerial view coordinate is located in the third warning region; generating a stained image corresponding to the vehicle side image to remind the driver when the third aerial view coordinate is located in the second warning region; and generating a warning sound to remind the driver when the third aerial view coordinate is located in the third warning region.

In addition to the aforesaid steps, the second embodiment can also execute all the operations and steps of the collision warning system 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

It shall be appreciated that in the specification and the claims of the present invention, some words (e.g., the aerial view coordinate, the horizontal distance, the vertical distance, and the warning region) are preceded by terms such as "first", "second", and "third," and these terms of "first", "second", and "third" are only used to distinguish these different words. For example, the "first", "second", and "third" warning regions are only used to indicate the warning region used in different operations.

According to the above descriptions, the collision warning technology (including the system and the method) provided by the present invention generates a plurality of objects and an object coordinate corresponding to each of the objects by analyzing the vehicle side image, calculates an aerial view coordinate corresponding to each of the objects based on the object coordinates and a pitch angle corresponding to the image capturing apparatus. Furthermore, the collision warning technology provided by the present invention calculates a predicted collision time between the vehicle and each of the objects based on the vehicle speed, the turning angle, and the aerial view coordinates. Finally, the collision warning technology provided by the present invention generates a plurality of warning regions and determines a warning scope corresponding to each of the warning regions based on the predicted collision times. The collision warning technology provided by the present invention accurately calculates the predicted collision time between the vehicle and each of the objects by considering the state of the vehicle, so that the warning scope of each of the warning regions can be dynamically adjusted to remind drivers to pay attention. In addition, the present invention further adds a fixed scope of the warning conditions to appropriately remind the driver of objects that are too close, so as to provide the driver with more reaction time. The collision warning technology provided by the present invention can adaptability adjust the warning scope of each of the warning regions according to the condition of the vehicle, and reduce the problem of excessively frequent or excessively loose warnings caused by the threshold setting problem.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A collision warning system, comprising:
   an image capturing apparatus, being installed at a side position of a vehicle to generate a vehicle side image;
   a sensor, being configured to sense a vehicle speed and a turning angle of the vehicle; and
   a processor, being connected to the image capturing apparatus and the sensor through a network, and being configured to perform following operations:
   analyzing the vehicle side image to generate a plurality of objects and an object coordinate corresponding to each of the objects;
   calculating an aerial view coordinate corresponding to each of the objects based on the object coordinates and a pitch angle corresponding to the image capturing apparatus;
   calculating a predicted collision time between the vehicle and each of the objects based on the vehicle speed, the turning angle, and the aerial view coordinates; and
   generating a plurality of warning regions and determining a warning scope corresponding to each of the warning regions based on the predicted collision times.

2. The collision warning system of claim 1, wherein the processor further stores an object detection model, and the processor further performs following operations:
   performing an object detection operation on the vehicle side image through the object detection model to generate the objects and the object coordinates corresponding to each of the objects.

3. The collision warning system of claim 1, wherein the processor further performs following operations:
   performing a distortion correction operation on the vehicle side image based on an apparatus parameter of the image capturing apparatus to generate a corrected object coordinate corresponding to each of the objects; and
   generating the aerial view coordinate corresponding to each of the objects based on the corrected object coordinates and the pitch angle corresponding to the image capturing apparatus.

4. The collision warning system of claim 1, wherein the processor further performs following operations:
   calculating a horizontal distance and a vertical distance between each of the objects and the image capturing apparatus based on the aerial view coordinates; and
   calculating the predicted collision time between the vehicle and each of the objects based on the vehicle speed, the turning angle, and the horizontal distance and the vertical distance corresponding to each of the objects.

5. The collision warning system of claim 1, wherein the processor further performs following operations:
   calculating a horizontal distance between each of the objects and the image capturing apparatus based on the aerial view coordinates;
   determining whether there exists at least one shortest horizontal distance lower than a first horizontal preset distance among the horizontal distances corresponding to each of the aerial view coordinates; and
   generating a warning message when determining that there exists the at least one shortest horizontal distance.

6. The collision warning system of claim 1, wherein the processor further performs following operations:
   determining whether there exists a second aerial view coordinate among the aerial view coordinates that a distance to the image capturing apparatus is lower than a second preset horizontal distance and a second preset vertical distance when determining that the turning angle of the vehicle is less than a threshold and the vehicle speed is greater than zero; and generating a warning message when determining that there exists the second aerial view coordinate that the distance to the image capturing apparatus is lower than the second preset horizontal distance and the second preset vertical distance.

7. The collision warning system of claim 1, wherein the collision warning system further comprises a display, and the display is configured to display the warning regions to remind a driver of the vehicle.

8. The collision warning system of claim 7, wherein the processor further performs following operations:

determining whether a third aerial view coordinate among the aerial view coordinates is located in the warning regions, wherein the warning regions comprises at least a first warning region, a second warning region, and a third warning region;

generating a warning scope image corresponding to the vehicle side image based on the warning scope of each of the warning regions when the third aerial view coordinate is located in the third warning region;

generating a stained image corresponding to the vehicle side image to remind the driver when the third aerial view coordinate is located in the second warning region; and generating a warning sound to remind the driver when the third aerial view coordinate is located in the third warning region.

9. The collision warning system of claim 1, wherein the processor further performs following operations:

determining whether the turning angle of the vehicle is greater than or equal to a threshold and the vehicle speed is greater than zero; and generating the warning regions and determining the warning scope corresponding to each of the warning regions based on the predicted collision times when determining that the turning angle of the vehicle is greater than or equal to the threshold and the vehicle speed is greater than zero.

10. The collision warning system of claim 1, wherein the processor further performs following operations:

determining whether the vehicle emits a turn signal and the vehicle speed is greater than zero; and generating the warning regions and determining the warning scope corresponding to each of the warning regions based on the predicted collision times when determining that the vehicle emits the turn signal and the vehicle speed is greater than zero.

11. A collision warning method, being adapted for use in a collision warning system, the collision warning system comprising an image capturing apparatus, a sensor, and a processor, the image capturing apparatus being installed at a side position of a vehicle and being configured to generate a vehicle side image, the sensor being configured to sense a vehicle speed and a turning angle of the vehicle, the collision warning method being performed by the processor and comprising following steps:

analyzing the vehicle side image to generate a plurality of objects and an object coordinate corresponding to each of the objects;

calculating an aerial view coordinate corresponding to each of the objects based on the object coordinates and a pitch angle corresponding to the image capturing apparatus;

calculating a predicted collision time between the vehicle and each of the objects based on the vehicle speed, the turning angle, and the aerial view coordinates; and generating a plurality of warning regions and determining a warning scope corresponding to each of the warning regions based on the predicted collision times.

12. The collision warning method of claim 11, wherein the processor further stores an object detection model, and the collision warning method further comprises following steps:

performing an object detection operation on the vehicle side image through the object detection model to generate the objects and the object coordinates corresponding to each of the objects.

13. The collision warning method of claim 11, wherein the collision warning method further comprises following steps:

performing a distortion correction operation on the vehicle side image based on an apparatus parameter of the image capturing apparatus to generate a corrected object coordinate corresponding to each of the objects; and generating the aerial view coordinate corresponding to each of the objects based on the corrected object coordinates and the pitch angle corresponding to the image capturing apparatus.

14. The collision warning method of claim 11, wherein the collision warning method further comprises following steps:

calculating a horizontal distance and a vertical distance between each of the objects and the image capturing apparatus based on the aerial view coordinates; and calculating the predicted collision time between the vehicle and each of the objects based on the vehicle speed, the turning angle, and the horizontal distance and the vertical distance corresponding to each of the objects.

15. The collision warning method of claim 11, wherein the collision warning method further comprises following steps:

calculating a horizontal distance between each of the objects and the image capturing apparatus based on the aerial view coordinates;

determining whether there exists at least one shortest horizontal distance lower than a first horizontal preset distance among the horizontal distances corresponding to each of the aerial view coordinates; and generating a warning message when determining that there exists the at least one shortest horizontal distance.

16. The collision warning method of claim 11, wherein the collision warning method further comprises following steps:

determining whether there exists a second aerial view coordinate among the aerial view coordinates that a distance to the image capturing apparatus is lower than a second preset horizontal distance and a second preset vertical distance when determining that the turning angle of the vehicle is less than a threshold and the vehicle speed is greater than zero; and generating a warning message when determining that there exists the second aerial view coordinate that the distance to the image capturing apparatus is lower than the second preset horizontal distance and the second preset vertical distance.

17. The collision warning method of claim 11, wherein the collision warning system further comprises a display, and the display is configured to display the warning regions to remind a driver of the vehicle.

18. The collision warning method of claim 17, wherein the collision warning method further comprises following steps:
   determining whether a third aerial view coordinate among the aerial view coordinates is located in the warning regions, wherein the warning regions comprises at least a first warning region, a second warning region, and a third warning region;
   generating a warning scope image corresponding to the vehicle side image based on the warning scope of each of the warning regions when the third aerial view coordinate is located in the third warning region;
   generating a stained image corresponding to the vehicle side image to remind the driver when the third aerial view coordinate is located in the second warning region; and
   generating a warning sound to remind the driver when the third aerial view coordinate is located in the third warning region.

19. The collision warning method of claim 11, wherein the collision warning method further comprises following steps:
   determining whether the turning angle of the vehicle is greater than or equal to a threshold and the vehicle speed is greater than zero; and
   generating the warning regions and determining the warning scope corresponding to each of the warning regions based on the predicted collision times when determining that the turning angle of the vehicle is greater than or equal to the threshold and the vehicle speed is greater than zero.

20. The collision warning method of claim 11, wherein the collision warning method further comprises following steps:
   determining whether the vehicle emits a turn signal and the vehicle speed is greater than zero; and
   generating the warning regions and determining the warning scope corresponding to each of the warning regions based on the predicted collision times when determining that the vehicle emits the turn signal and the vehicle speed is greater than zero.

* * * * *